US011188993B2

(12) United States Patent
Sharma et al.

(10) Patent No.: US 11,188,993 B2
(45) Date of Patent: Nov. 30, 2021

(54) METHOD AND SYSTEM FOR MANAGING EVACUATIONS USING POSITIONING SYSTEMS

(71) Applicant: Sensormatic Electronics, LLC, Boca Raton, FL (US)

(72) Inventors: Amit Kumar Sharma, Bangalore (IN); Rakesh Kumar, Bangalore (IN); Shubhendu Konar, Kolkata (IN)

(73) Assignee: Sensormatic Electronics, LLC, Boca Raton, FL (US)

( * ) Notice: Subject to any disclaimer, the term of this patent is extended or adjusted under 35 U.S.C. 154(b) by 655 days.

(21) Appl. No.: 14/288,578

(22) Filed: May 28, 2014

(65) Prior Publication Data

US 2015/0348220 A1   Dec. 3, 2015

(51) Int. Cl.
*G06Q 50/26* (2012.01)
*G06Q 10/00* (2012.01)
*G06Q 90/00* (2006.01)

(52) U.S. Cl.
CPC ........... *G06Q 50/265* (2013.01); *G06Q 10/00* (2013.01); *G06Q 90/205* (2013.01)

(58) Field of Classification Search
CPC .... G06Q 50/265; G06Q 10/00; G01C 21/206; G01C 21/3407; G08B 7/066
USPC ........................................................ 705/324
See application file for complete search history.

(56) References Cited

U.S. PATENT DOCUMENTS

| 7,579,945 B1* | 8/2009 | Richter | .................. G08B 25/14 340/286.14 |
| 2004/0163325 A1* | 8/2004 | Parrini | .................... B66B 5/022 52/1 |
| 2005/0190053 A1* | 9/2005 | Dione | .................... G06Q 10/06 340/500 |

(Continued)

FOREIGN PATENT DOCUMENTS

| WO | 2005/104724 A2 | 11/2005 | | |
| WO | WO 2005104724 A2 * | 11/2005 | ............. | G06Q 10/06 |
| WO | WO-2014137384 A1 * | 9/2014 | ............. | G08B 7/066 |

OTHER PUBLICATIONS

Cheraghi; SafeExit4All An Inclusive Indoor Emergency Evacuation System for People With Disabilities; May 13-15, 2019; https://par.nsf.gov/servlets/purl/10123203 ; p. 1-10.*

(Continued)

*Primary Examiner* — Jerry O'Connor
*Assistant Examiner* — James Webb
(74) *Attorney, Agent, or Firm* — HoustonHogle LLP

(57) ABSTRACT

In a system and method for managing evacuations of buildings, in response to detection of a fire, a control panel initiates an alarm condition and activates annunciation devices to signal that an evacuation of the building is required. A positioning and evacuation system tracks locations of occupants in the building and the progression of the fire. The positioning and evacuation system generates individualized evacuation paths for the occupants, which are transmitted to and displayed on mobile computing devices of the occupants. Additionally, the positioning and evacuation system generates turn by turn directions of the individualized evacuation paths, which are displayed on three dimensional maps or with augmented reality on the mobile computing devices of the occupants.

28 Claims, 7 Drawing Sheets

(56) References Cited

U.S. PATENT DOCUMENTS

| | | | | |
|---|---|---|---|---|
| 2007/0049259 | A1* | 3/2007 | Onishi | A62B 99/00 455/414.2 |
| 2008/0086455 | A1* | 4/2008 | Meisels | G01C 21/26 |
| 2011/0136463 | A1* | 6/2011 | Ebdon | G01C 21/20 455/404.1 |
| 2011/0141141 | A1* | 6/2011 | Kankainen | G01C 21/3647 345/632 |
| 2013/0242074 | A1* | 9/2013 | Sekiguchi | G08B 7/066 348/77 |
| 2014/0032110 | A1* | 1/2014 | Simring | G01C 21/34 701/533 |
| 2014/0253326 | A1* | 9/2014 | Cho | G08B 25/10 340/539.13 |

OTHER PUBLICATIONS

International Search Report and Written Opinion of the International Searching Authority, dated Jul. 3, 2015, from counterpart International Application No. PCT/US2015/026566, filed on Apr. 19, 2015.

"Guardly Command™." Guardly Public safety and mobile security service. Guardly. Web. Accessed Apr. 30, 2014. <https://www.guardly.com/technology/guardly-command>.

"Guardly Mobile Safety Apps." Guardly Public safety and mobile security service. Guardly. Web. Accessed Apr. 30, 2014. <https://www.guardly.com/technology/mobile-safety-apps>.

"Guardly Platform API." Guardly Public safety and mobile security service. Guardly. Web. Accessed Apr. 30, 2014. <https://www.guardly.com/technology/api>.

"Indoor Positioning System." Guardly Public safety and mobile security service. Guardly. Web. Accessed Apr. 30, 2014. <https://www.guardly.com/technology/indoor-positioning-system>.

"Mobile Mass Notification System." Guardly Public safety and mobile security service. Guardly. Web. Accessed Apr. 30, 2014. <https://www.guardly.com/technology/mobile-mass-notification-system>.

"Universities & Colleges." Guardly Public safety and mobile security service. Guardly. Web. Apr. 30, 2014. <https://www.guardly.com/solutions/industry/university-college>.

Zahavi, Nir. "Guardly Command Goes Mobile, Adds Mass Notification Features." Guardly Blog. Guardly, Apr. 30, 2014. Web. Accessed Apr. 30, 2014. <http://blog.guardly.com/guardblog/2014/04/30/guardly-commandgoes-mobile-adds-mass-notification-features/>.

International Preliminary Report on Patentability, dated Dec. 8, 2016, from International Application No. PCT/US2015/026566, filed Apr. 19, 2015. Eight pages.

\* cited by examiner

METHOD AND SYSTEM FOR MANAGING EVACUATIONS USING POSITIONING SYSTEMS

BACKGROUND OF THE INVENTION

Fire protection systems are often installed within or around buildings. Examples include shopping malls, office buildings, primary and secondary school or university buildings, hospitals, government buildings and casinos, to list examples. These fire protection systems typically include one or more control panels and fire detection devices (e.g., smoke detectors, heat sensors, carbon dioxide detectors, and/or carbon monoxide detectors), which are connected to the control panel. The fire detection devices monitor the buildings for indicators of fire such as smoke, rapid rises in temperature, flames, or hazardous gases, to list a few examples.

If indicators of fire are detected, the control panel initiates an alarm condition. When in the alarm condition, the control panel often activates annunciation devices such as speakers/horns, bells/chimes, light emitting diode (LED) reader boards, or flashing lights (e.g., strobes) that are located throughout the buildings. These annunciation devices provide visual and audible warnings of a potential fire and signal that an evacuation of the building is required.

Currently, building codes often require systems for aiding occupants during an evacuation. For example, hotels typically have room-specific placards in each guest room to help guide the occupants toward exits during a fire or other emergency. Generally, these placards illustrate a floor plan and an evacuation path to a safe exit. Additionally, placards or signs also may be installed in other public areas of the hotel such as conference rooms, business centers, or hallways, for example. Typically, the building codes also require that occupants of buildings participate in periodic evacuation drills, which allow the occupants to practice evacuating the building. These evacuation drills are commonly observed by a firefighter or first responder to identify unsafe practices that could be dangerous during a real emergency.

Recently, systems have been proposed to provide real-time tracking of occupants during an emergency. In the emergency, an occupant uses an application (or app) running on a mobile computing device, for example. The app transmits the identity of the user of mobile device, his/her location, and the nature of the emergency to dispatchers/operators and an incident management system. During the emergency, the incident management system performs real-time tracking of the occupants using Wireless E911 Phase 2 industry requirements based on GPS (Global Positioning System) locations of callers or a special purpose indoor positioning system.

SUMMARY OF THE INVENTION

One problem with the recently proposed systems is that they are not closely integrated with existing fire protection systems. In operation, the systems rely on users to contact the dispatchers/operators via mobile computing devices to report an emergency. These systems may be prone to human error and delay as well as false alarms related to accidental activation.

Furthermore, the recently proposed systems lack the ability to direct occupants during an evacuation of the building. While the systems do track the occupants during the emergency, this information is not utilized in a way to actively guide the occupants out of danger (e.g., to safe exits).

Embodiments of the present invention concern a system for managing the evacuation of a building. More specifically, the system can include fire detection devices, which monitor a building for indicators of fire (e.g., smoke, rapid rise in temperature, fire, or hazardous gases). In response to a fire, a control panel will initiate an alarm condition and activate annunciation devices to signal that an evacuation of the building is required, for example. A positioning and evacuation system tracks locations of the occupants in the building and generates individualized evacuation paths for each occupant in one example. Additionally, the positioning and evacuation system might even generate turn by turn directions that include audible and/or visual directions. These evacuation paths and turn by turn directions are then transmitted to and displayed on mobile computing devices of the occupants.

In general, according to one aspect, the invention features a system for managing an evacuation of a building. The system includes fire detection devices that monitor the building for fire. The system further includes a positioning and evacuation system that tracks locations of occupants of the building and directs the evacuation based on information from the fire detection devices.

Preferably, the positioning and evacuation system generates individualized evacuation paths based on information from the fire detection devices and forwards the individualized evacuation paths to the occupants.

In embodiments, a control panel receives event data from the fire detection devices and signals a fire alarm condition for the building in response to fire being detected. The positioning and evacuation system transmits the evacuation paths to the occupants in response to the fire alarm condition.

Typically, the system further includes mobile computing devices of the occupants that display the individualized evacuation paths from the positioning and evacuation system. Additionally, the positioning and evacuation system generates turn by turn directions for the individualized evacuation paths, which are transmitted to and displayed by the mobile computing devices of the occupants.

Preferably, the individualized evacuation paths are displayed in a user interface, which includes icons to indicate unsafe or blocked evacuation paths that must be avoided during the evacuation.

In a typical implementation, the positioning and evacuation system prioritizes the order in which occupants are evacuated based on an availability of evacuation paths and each of the occupant's proximity to danger. Additionally, the positioning and evacuation system forwards the individualized evacuation paths to the occupants in a sequence based on the prioritized evacuation order.

Preferably, the positioning and evacuation system monitors a number of occupants that have been evacuated and a number of occupants remaining in the building. Additionally, the positioning and evacuation system forwards the number of occupants that have been evacuated and the locations of the occupants remaining in the building to first responders.

In a typical implementation, the fire detection devices are smoke detectors, heat sensors, carbon dioxide detectors, and/or carbon monoxide detectors.

In general, according to another aspect, the invention features a method for evacuating a building. The method includes monitoring the building for indicators of fire with fire detection devices and tracking locations of occupants in the building. The method further includes directing evacuation of the building based on information from the fire detection devices.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1A:
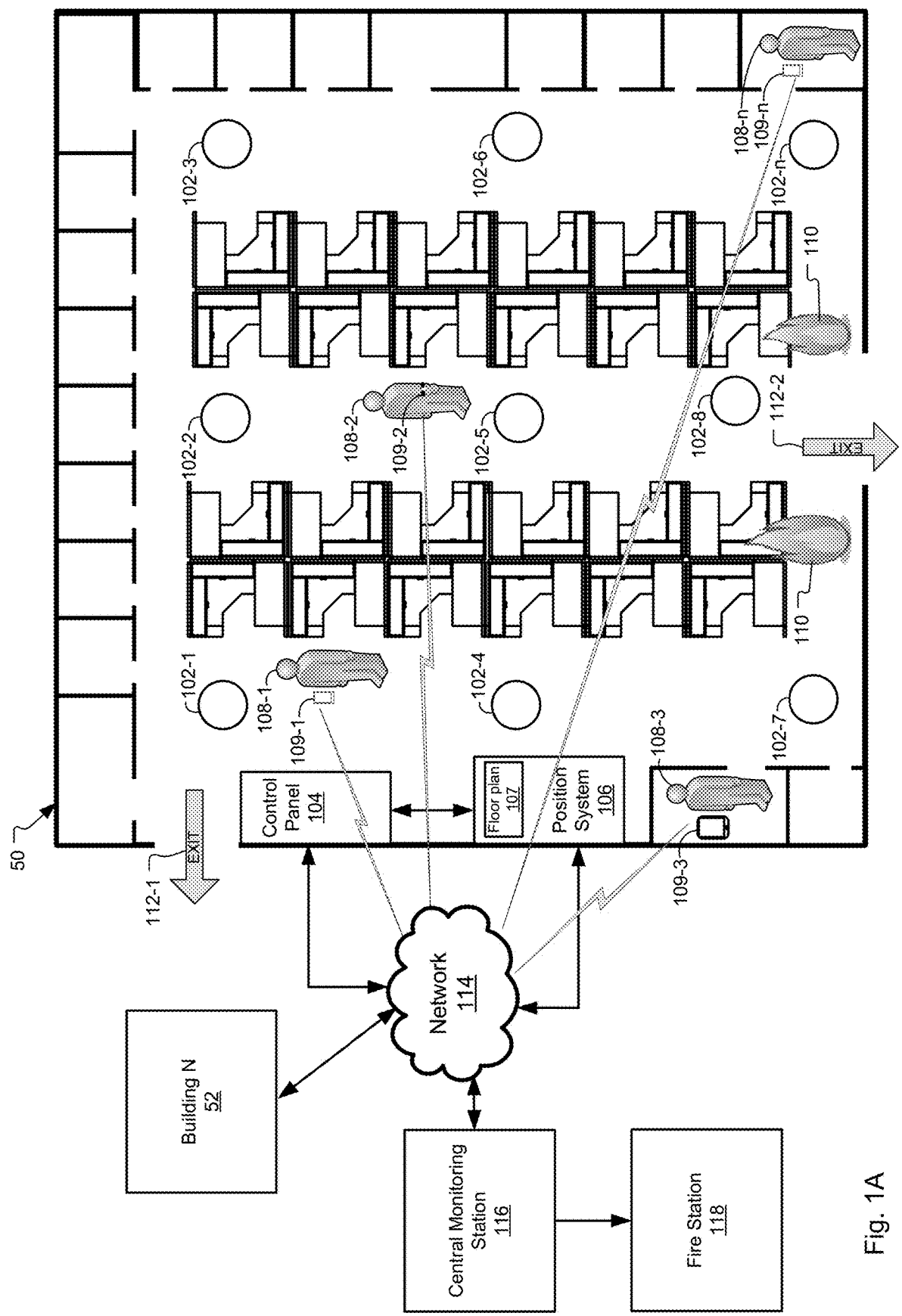
FIG. 1A is a schematic diagram showing a floor plan of a building, a fire protection system, which includes fire detection devices and a control panel, and a positioning and evacuation system for managing the evacuation of the building.

FIG. 1A illustrates a floor plan of a building 50, a fire protection system, which includes fire detection devices 102-1 to 102-$n$ and a control panel 104, and a positioning and evacuation system 106 for managing the evacuation of the building 50.

In a typical implementation, the fire detection devices 102-1 to 102-$n$ are installed throughout the building 50 and monitor for indicators of fire. While the illustrated example shows an office building with a simple floor plan and only two exits 112-1 and 112-2, the building 50 could be a larger building or other structure such as a shopping mall, school or university, hospital, government building, or casino, to list other examples. Additionally, the building 50 could also be part of an interconnected campus or office park, which is comprised of multiple interconnected buildings (e.g., building 50 and building N 52).

The fire detection devices 102-1 to 102-$n$ typically include smoke detectors, flame detectors, carbon monoxide detectors, carbon dioxide detectors, temperature sensors, and/or pull stations, to list a few examples. Typically, the fire detection devices 102-1 to 102-$n$ are connected to a network of the building 50, which supports data and/or analog communication between the devices 102-1 to 102-$n$ and the control panel 104.

The control panel 104 receives event data from the fire detection devices 102-1 to 102-$n$ and initiates an alarm condition if the received event data are indicative of an alarm condition (e.g., a fire). During an alarm condition, the control panel 104 signals for an evacuation of the building by activating fire annunciation devices (e.g., speakers/horns, bells/chimes, light emitting diode (LED) reader boards and/or flashing lights) located throughout the building 50.

Occupants 108-1 to 108-$n$ (e.g., employees, visitors, clients/customers, building management, maintenance workers) are located throughout the building 50. In a typical implementation, the occupants 108-1 to 108-$n$ operate mobile computing devices. Some examples of mobile computing devices include smartphones, tablet computers, and laptops/email clients, to list a few examples. Additionally, the mobile computing devices include wearable smart devices such as smart watches or head-up displays, for example.

The positioning and evacuation system 106 tracks occupants as they move within the building 50 and generates individualized evacuation paths. Additionally, the positioning and evacuation system 106 generates turn by turn directions, which are transmitted to and displayed in a display of the mobile computing devices 109-1 to 109-$n$ of the occupants 108-1 to 108-$n$ via a network 114. The evacuation paths and turn by turn directions are displayed on a floor plan 107 of the building, which is stored by the positioning and evacuation system 106. Generally, the floor plan 107 is a simplified version of the blueprint of the entire building, which includes layouts of each floor in the building.

In a preferred embodiment, the positioning and evacuation system 106 utilizes technologies for tracking locations of occupants, which technologies include geo-positioning, geo-sensor, GSM (Global System for Mobile Communications), geo-magnetic, Wi-Max, or Wi-Fi. In one example, the positioning and evacuation system 106 receives data (e.g., signal strength or time of flight of a transmission) from the mobile computing devices via the network 114. Based on the received data, the positioning and evacuation system 106 calculates locations of the occupants. In an alternative example, the mobile computing devices calculate their positions based on signals received from access points or cellular radio towers, for example, and transmit the location information to the positioning and evacuation system 106.

A central monitoring station 116 monitors for alarm conditions across multiple buildings (e.g., building 50 and building 52). In one embodiment, the central monitoring station 116 is a remote monitoring service that monitors the fire protection systems and positioning and evacuation systems installed in different locations in different office parks or states. In an alternative embodiment, the central monitoring station 116 is part of a control room, for example, which is located in the building 50 being monitored. Additionally, in a preferred embodiment, the central monitoring station 116 forwards the alarm information and the occupants' location to a fire station 118 and/or first responders.

Figure 1B:
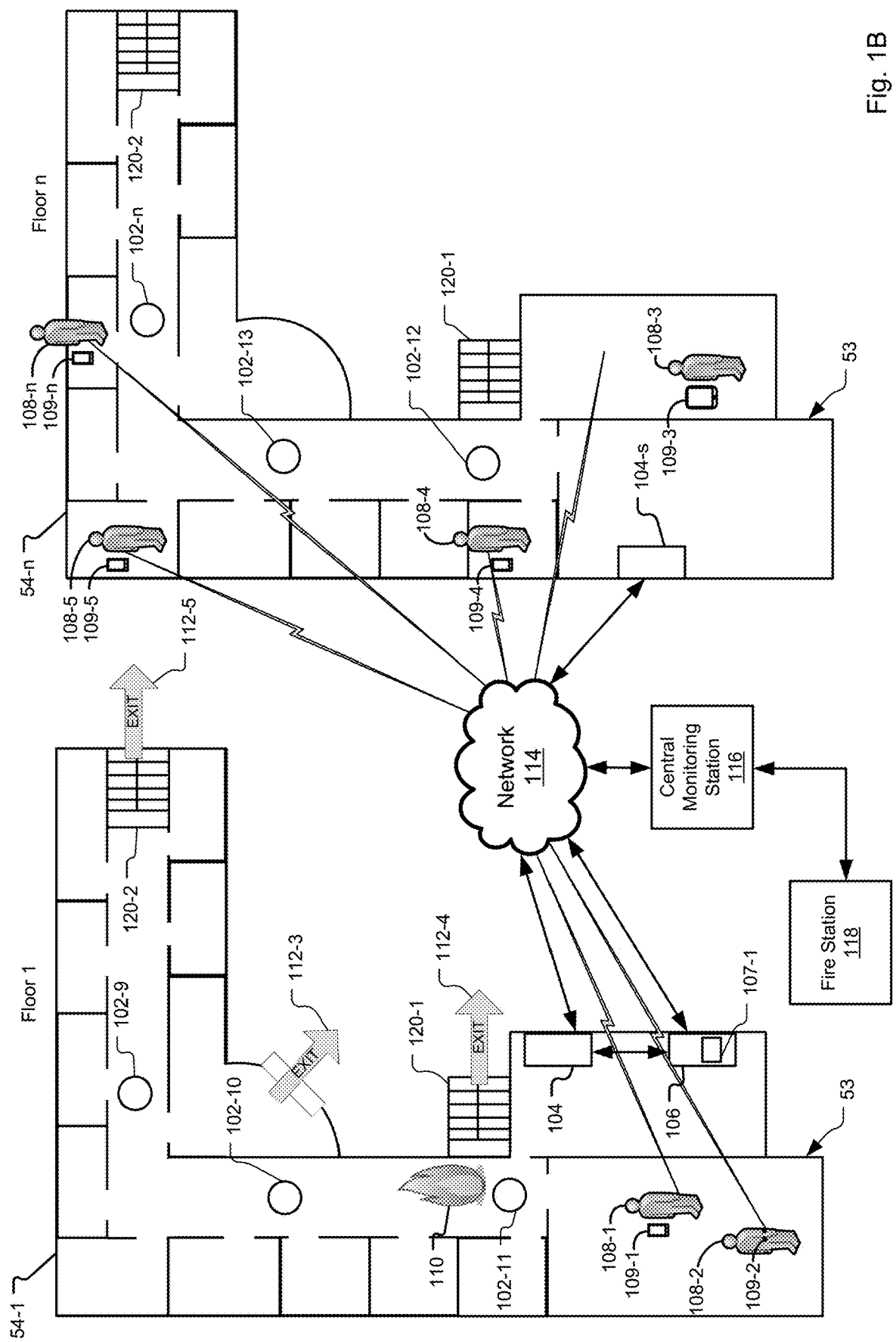
FIG. 1B is a schematic diagram showing a floor plan illustrating an alternative embodiment of the fire protection system and positioning and evacuation system, which are implemented in a building with multiple floors.

FIG. 1B is a block diagram illustrating an alternative embodiment of a building 53, which includes occupants 108-1 to 108-n located on multiple floors 54-1 to 54-n.

In general, the fire protection system and the position and evacuation system operate nearly identical to the embodiment described with respect to FIG. 1A. In this embodiment, however, the building 53 is a multi-storied structure with numerous floors 54-1 to 54-n.

In general, fire protection systems are divided into separate zones, and each zone is monitored by a sub-panel or independent control panel. These sub-panels receive event data from the fire detection devices of their zone and then forward the information to a main control panel.

In the illustrated example, the floors 54-1 to 54-n are divided into different zones. Accordingly, the fire detection devices located on floor 1 (e.g., devices 102-9 through 102-11) send event data to the control panel 104. Similarly, the fire detection devices located on floor n (e.g., devices 102-12 to 102-n) send event data to sub-panel 104-s, which then forwards the event data to the control panel 104. Additionally, the sub-panel 104-s may also send the event data to central monitoring station 116.

In response to an alarm condition, all of the occupants 108-1 to 108-n in the building 53 are notified by the positioning and evacuation system 106 regardless of their proximity to the fire 110. This ensures that all occupants receive an early warning about the detected fire.

Often, the users that are not located in close proximity to the fire may be routed on longer evacuation paths. By way of example, all of the occupants on floor n (e.g., 108-3 to 108-n) may be directed to stairway 120-2 and to exit 112-5 even though stairway 120-1 and exits 112-3 and 112-4 are closer. By directing the occupants to stairway 120-2 and out exit 112-5, the positioning and evacuation system 106 ensures that these occupants are guided away from the fire 110 and the other exits and stairways remain available (or less crowded) for other occupants, who may be closer to the fire. This routing helps prevent stampedes and/or bottlenecks during the evacuation.

Figure 2:
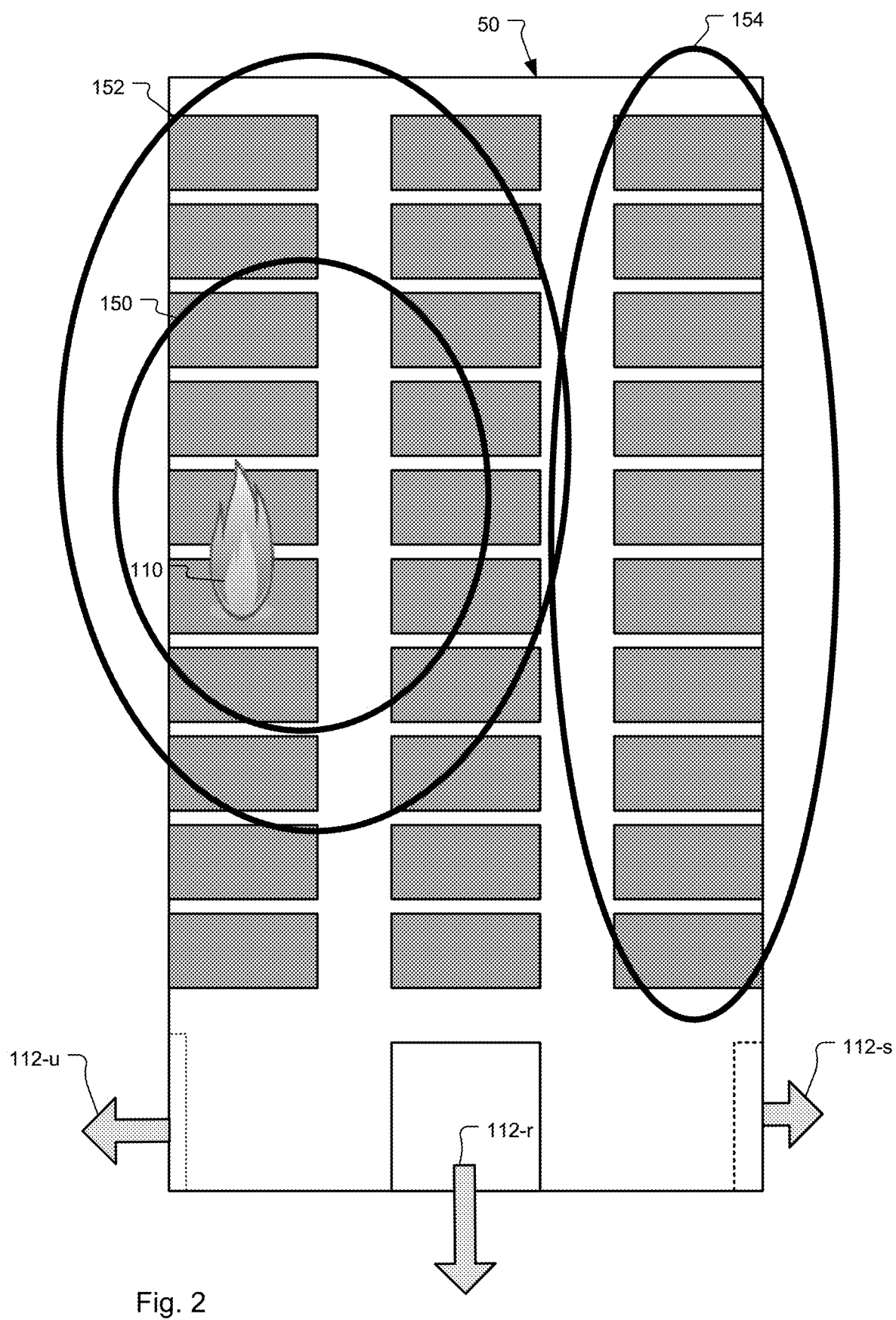
FIG. 2 is a schematic drawing of the front elevation of a multi-storied building showing it divided into high, medium, and low risk zones and further illustrates a safe exit, a risky exit, and an unsafe exit.

FIG. 2 illustrates an example of how the building 50 is divided into a high risk zone 150, a medium risk zone 152, and a low risk zone 154.

In the illustrated embodiment, the high risk zone 150 is the area in the immediate vicinity of the fire 110. During an evacuation, the occupants in this high risk zone are evacuated first because they are in the greatest danger. The medium risk zone 152 refers to the areas of the building that is adjacent to the high risk zone 150 and the low risk zone 154 refers to one or more areas of the building which are farthest away from the fire 110. Consequently, these occupants in the medium risk zone 152 and low risk zone 154 are generally evacuated after the occupants in the high risk zone 150.

Additionally, the illustrated embodiment provides an example of an unsafe exit 112-u, a risky exit 112-r, and a safe exit 112-s. In general, the unsafe exit 112-u must be avoided during evacuation because the occupants would be required to evacuate through or dangerously close to the fire 110. Preferably, the risky exit 112-r should also be avoided during the evacuation if possible because of its proximity to the fire. However, occupants may still use this exit if necessary. If possible, the occupants are evacuated via the safe exit 112-s because this exit is typically the farthest away from the fire and/or danger.

Figure 3:
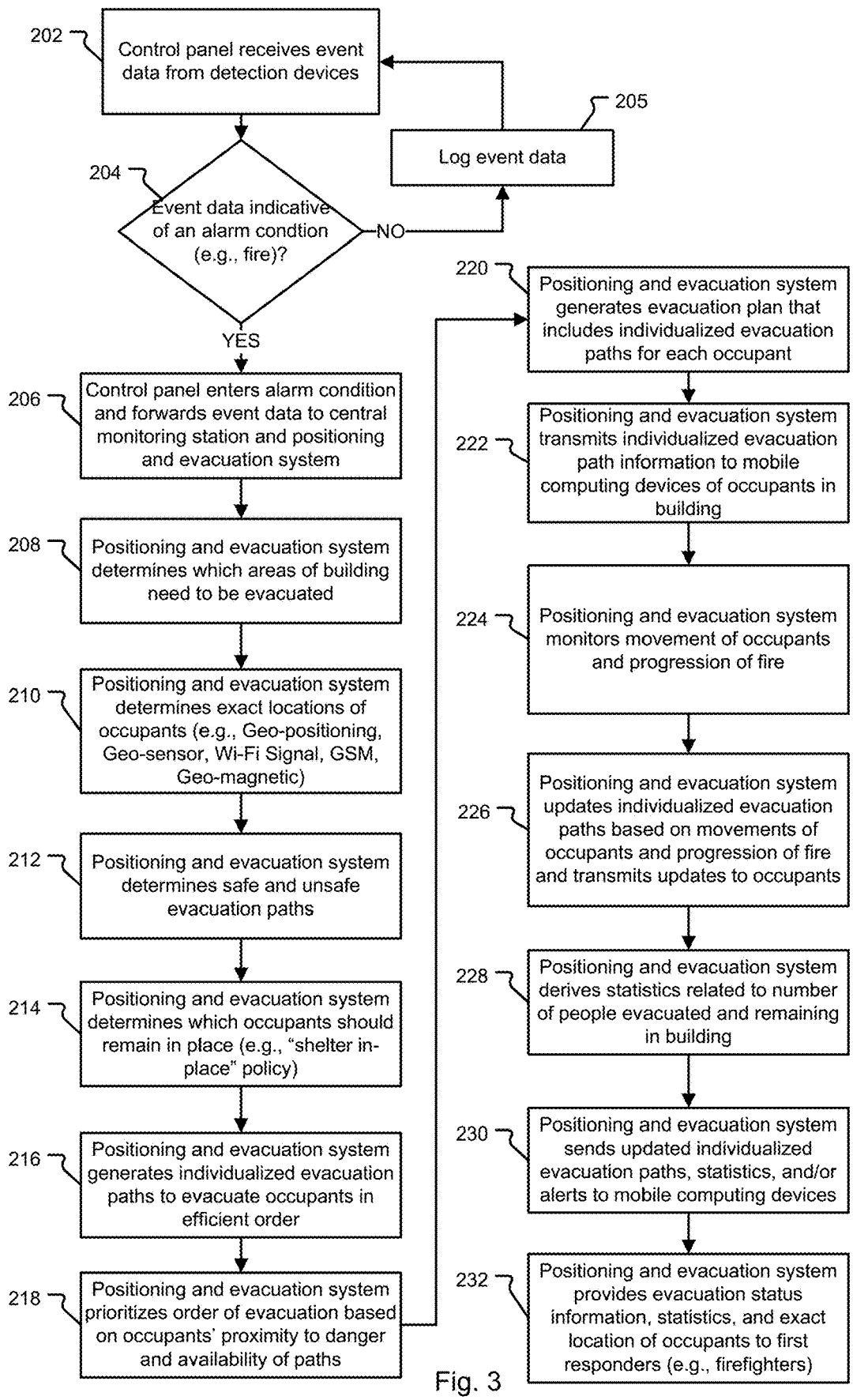
FIG. 3 is a flowchart illustrating the steps performed by the positioning and evacuation system after the control panel receives event data from fire detection device that are indicative of an alarm condition.

FIG. 3 is a flowchart illustrating the steps performed by the positioning and evacuation system 106 after the control panel 104 receives event data from fire detection devices 102-1 to 102-n that are indicative of an alarm condition.

In the first step 202, the control panel 104 receives event data from the fire detection devices 102-1 to 102-n. The control panel 104 then determines if the event data are indicative of a fire in step 204. If the event data are not indicative of a fire, then the control panel 104 logs the event data in step 205. If the event data are indicative of an alarm condition, then the control panel 104 initiates an alarm condition and forwards the event data to the central monitoring station 116 and the positioning and evacuation system 106 in step 206.

The positioning and evacuation system 106 determines which areas of the building need to be evacuated in step 208. In a current implementation, the system 106 utilizes an algorithm to determine which floors and parts of the building are affected by the fire. In the next step 210, the system 106 determines exact locations of occupants using, for example, a geo-positioning system, a geo-sensor based system, a Wi-Fi signal based system, a GSM (Global System for Mobile Communications) based system, or geo-magnetic based system. The system 106 then determines safe and unsafe evacuation paths in step 212.

In the next step 214, the system 106 determines which occupants, if any, should remain in place. Often this is referred to as a "shelter in-place" policy, which is utilized when there are no safe evacuation paths. Next, in step 216, the system 106 generates evacuation paths to evacuate occupants in an efficient order. The system 106 prioritizes the order of the evacuation based on occupants' proximity to danger and the availability of evacuation paths in step 218. In the next step 220, the system 106 generates an evacuation plan that includes evacuation paths for each occupant. In order to efficiently evacuate all the occupants in the building, the system 106 may route some occupants on longer paths and/or to indirect exits, for example. Alternatively, the algorithm of the system 106 may instruct some occupants in low risk zones to remain in place until the occupants in the high or medium risk zones have evacuated. This is to reduce the possibility of stampedes or bottlenecks during the evacuation.

In the next step 222, the system 106 transmits individualized evacuation path information to mobile computing devices of the occupants via the network 114. The system 106 then monitors movements of the occupants and movement of the fire in step 224. Additionally, the system 106 monitors a number of occupants that have been successfully evacuated from the building and a number of occupants remaining in the building. In the next step 226, the system 106 updates the evacuation paths (if necessary) based on the movements of the occupants and the fire and forwards those updated individualized evacuation paths to the occupants.

Next, in step 228, the system 106 derives statistics related to the number of people evacuated and the number of people remaining in the building. The system sends updated evacuation paths and/or alerts to mobile computing devices in step 230. The system 106 provides an evacuation status information, statistics, and exact locations of the occupants to the first responders (e.g., firefighters) in step 232.

Figure 4:
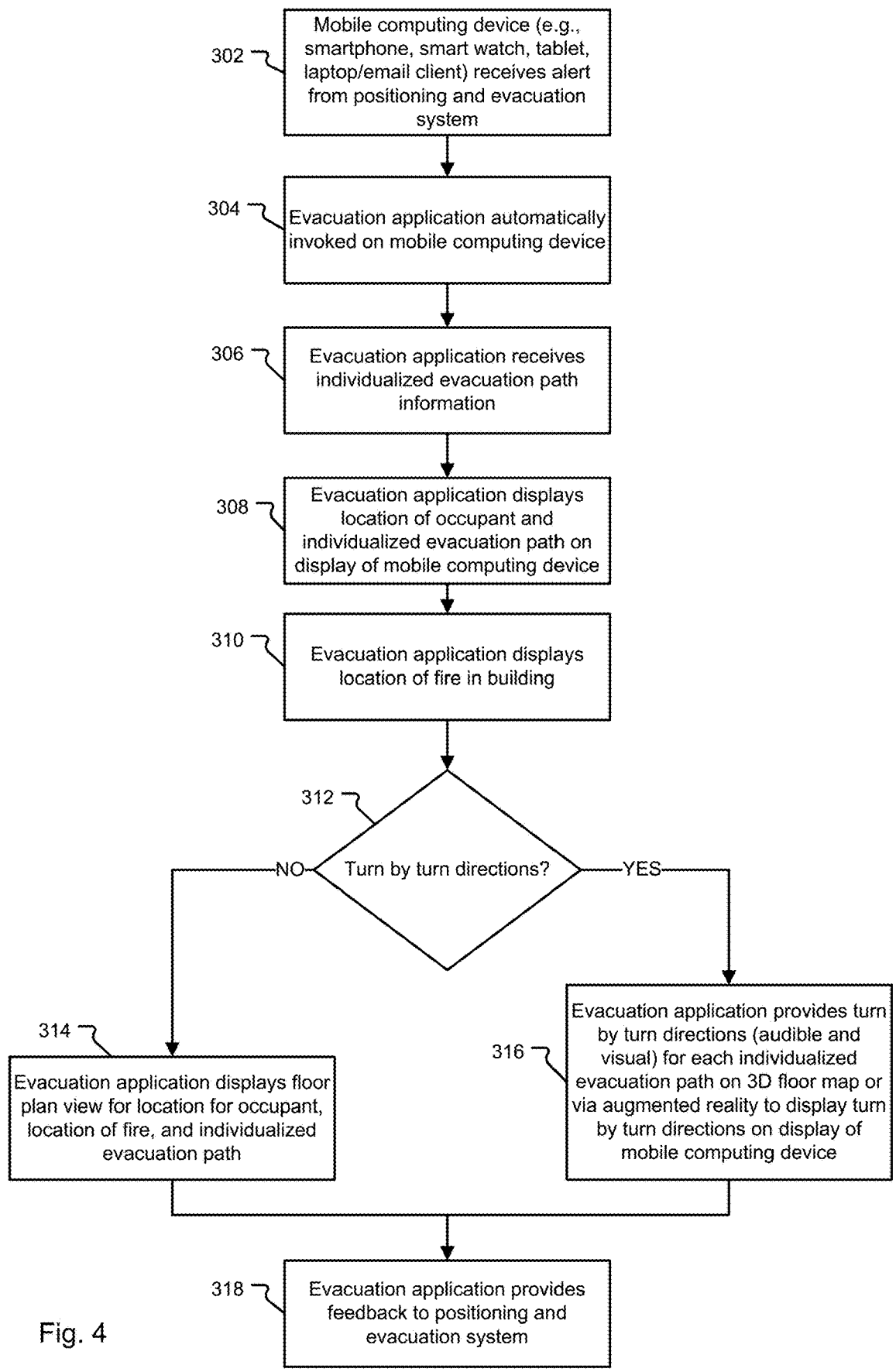
FIG. 4 is a flow diagram illustrating steps performed by an evacuation application, which resides and executes on the mobile computing devices of the occupants.

FIG. 4 is a flow diagram illustrating the steps performed by an evacuation application that is executing on the mobile computing devices (e.g., 109-1 to 109-n) of occupants (e.g., 108-1 to 108-n).

In the first step 302, the mobile computing device (e.g., smartphone, smart watch, tablet, laptop/email client) receives an alert from the positioning and evacuation system 106. Next, in step 304, the evacuation application is automatically invoked on the mobile computing device. Then, the evacuation application receives individualized evacuation path information in step 306. The evacuation application then displays the location of the occupant and the individualized evacuation path on the display of the mobile computing device in step 308. The evacuation application displays the location of the fire 110 in the building in step 310.

In the next step 312, the evacuation application determines if the occupant has requested turn by turn guidance. If the occupant has requested turn by turn guidance, then the turn by turn directions for the evacuation path are displayed on a three dimensional floor map or via augmented reality to display turn by turn directions on the display of the mobile computing device in step 316. If the occupant has not requested turn by turn directions, the evacuation application displays a floor plan of the building, a location of the occupant, a location of the fire as it progresses, and the individualized evacuation path in step 314. In the next step 318, the evacuation application provides feedback to the positioning and evacuation system 106 via the network 114.

Figure 5:
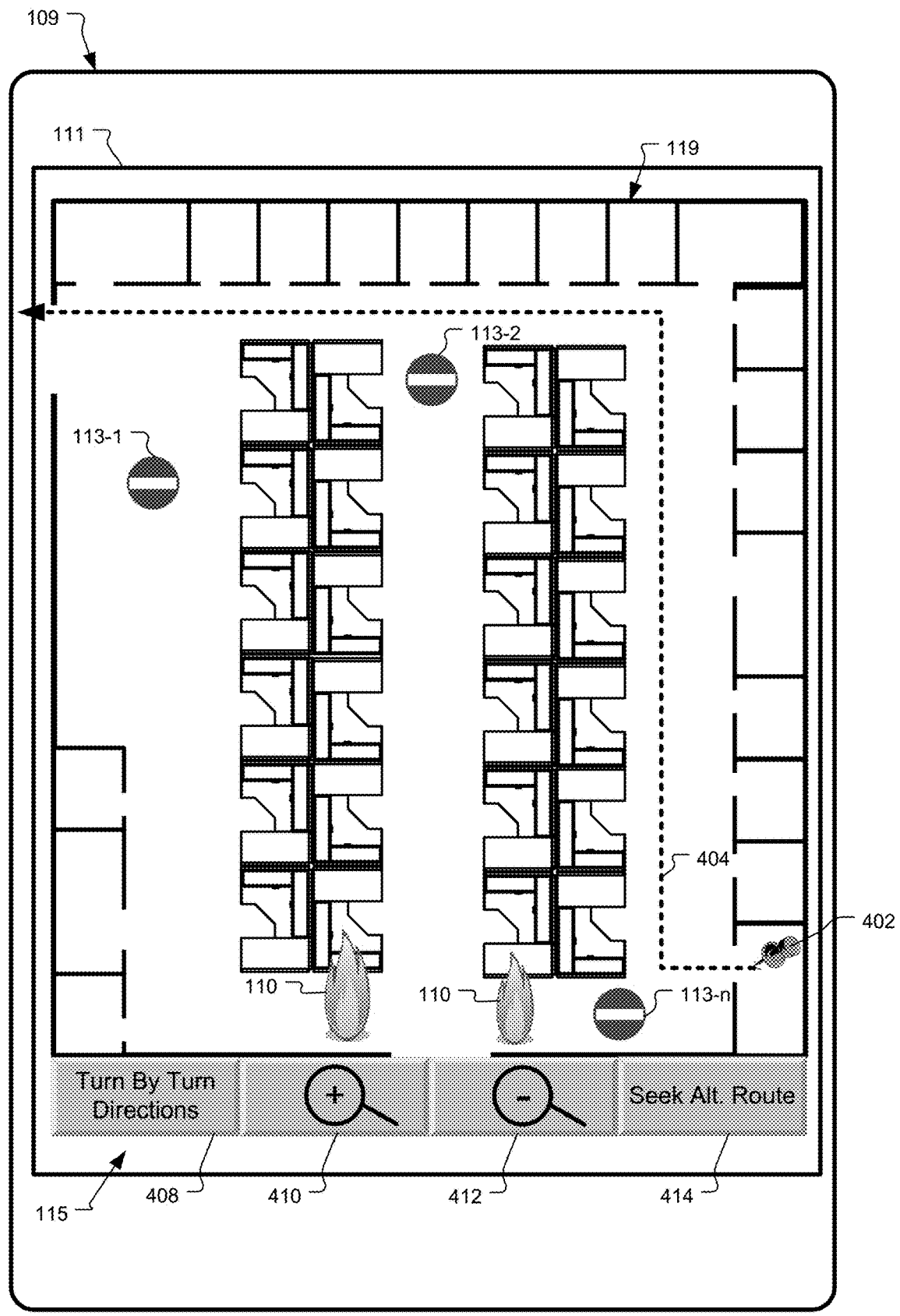
FIG. 5 illustrates a user interface displayed on the mobile computing device that displays a floor plan of the building, the location of the fire, the occupant's location, and an individualized evacuation path.

FIG. 5 illustrates a user interface 115 displayed on a display 111 of the mobile computing device 109. In the illustrated example, the user interface 115 displays a floor plan of the building 119, the location of the fire 110, the occupant's location 402, and an individualized evacuation path 404.

Additionally, the evacuation application displays the location of the fire 110 as it progresses (or is suppressed) and provides one or more "no entry" icons 113-1 to 113-n to indicate paths that are blocked and must be avoided during the evacuation.

In the illustrated example, the user interface 115 further includes selectable icons that enable the occupant to view turn by turn directions 408, zoom in 410, zoom out 412, or seek an alternate route 414. Alternatively, the user interface 115 could include selectable icons for other options such as settings, volume, enabling a flashlight app, or accessing communication features (e.g., text, phone, or electronic mail), to list a few examples.

Figure 6:
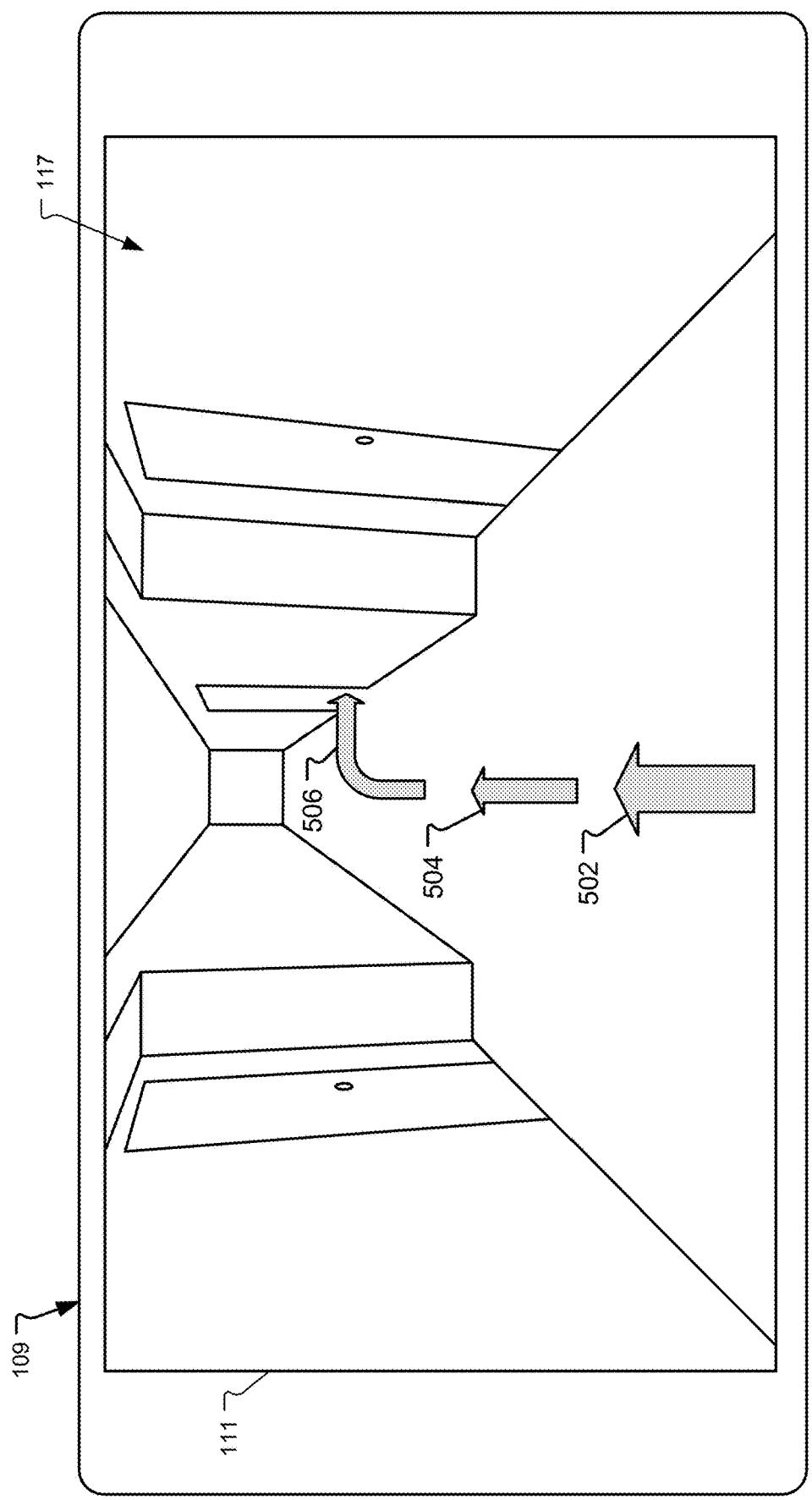
FIG. 6 illustrates user interface displayed on the mobile computing device including a map and turn by turns directions.

FIG. 6 illustrates a three dimensional map or an actual or synthetic image of a hallway of 117 and turn by turn directions, which are displayed on the display 111 of the mobile computing device 109.

In the illustrated example, turn by turn directions (audible and visual) are overlaid on a three dimensional floor map. Arrows 502, 504, 506 provide visual turn by turn indications of the evacuation path. Alternatively, augmented reality may be implemented to provide the directions on the display screen of the mobile computing device. In this embodiment, a camera function of the mobile computing device is enabled and arrows would be overlaid on the screen, which operates as the viewfinder.

While this invention has been particularly shown and described with references to preferred embodiments thereof, it will be understood by those skilled in the art that various changes in form and details may be made therein without departing from the scope of the invention encompassed by the appended claims.

What is claimed is:

1. A system for managing evacuation of a building, the system comprising:
   fire detection devices that monitor the building for fire;
   mobile computing devices of occupants of the building; and
   a positioning and evacuation system that tracks locations of the occupants of the building and directs the evacuation based on information from the fire detection devices and generates individualized evacuation paths for each of the occupants and transmits the evacuation paths to the mobile computing devices and updates the evacuation paths based on movements of the occupants and the fire and forwards those updated evacuation paths to the mobile computing devices of the occupants; and
   wherein the mobile computing devices of the occupants display the evacuation paths received from the positioning and evacuation system on maps displayed on displays of the mobile computing devices, the paths being indicated by arrows overlaid on the maps displayed on the displays of the mobile computing devices; and
   wherein the positioning and evacuation system prioritizes the order in which occupants are evacuated based on an availability of evacuation paths and each of the occupant's proximity to danger and the positioning and evacuation system forwards individualized evacuation paths to the mobile computing devices of the occupants in a sequence based on the prioritized evacuation order.

2. The system according to claim 1, further comprising a control panel that receives event data from the fire detection devices and signals a fire alarm condition for the building in response to fire being detected, the positioning and evacuation system transmitting the evacuation paths to the occupants in response to the fire alarm condition.

3. The system according to claim 1, wherein the positioning and evacuation system generates turn by turn directions for the individualized evacuation paths, the turn by turn directions being transmitted to and displayed by the mobile computing devices of the occupants.

4. The system according to claim 1, wherein the individualized evacuation paths are displayed in a user interface, which includes icons to indicate unsafe or blocked evacuation paths that must be avoided by the occupants during the evacuation.

5. The system according to claim 1, wherein the positioning and evacuation system monitors a number of occupants that have been evacuated and a number of occupants remaining in the building.

6. The system according to claim 5, wherein the positioning and evacuation system forwards the number of occupants that have been evacuated and the locations of the occupants remaining in the building to first responders.

7. The system according to claim 1, wherein the fire detection devices are smoke detectors, heat sensors, carbon dioxide detectors, and/or carbon monoxide detectors.

8. The system of claim 1, wherein the maps comprise three dimensional floor maps, and turn by turn directions for the occupants are overlaid on the three dimensional floor maps.

9. The system of claim 1, wherein turn by turn directions for the occupants are displayed via augmented reality.

10. The system of claim 1, wherein the mobile computing devices display selectable icons that enable the occupants to view turn by turn directions, zoom in, zoom out, and seek an alternative route.

11. The system of claim 1, wherein the mobile computing devices display images of hallways with arrows overlaid on the image to provide turn by turn directions of the evacuation path.

12. The system of claim 1, wherein the positioning and evacuation system routes some occupants on longer paths and/or to indirect exits in high risk zones of the building while instructing occupants in low risk zones to remain in place until the occupants in the high risk zones have evacuated.

13. The system of claim 12, wherein the positioning and evacuation system ensures that particular evacuation paths and particular exits remain available or less crowded for occupants that are located in close proximity to the fire by routing occupants that are not located in close proximity to the fire on longer evacuation paths to indirect exits, wherein the longer evacuation paths are longer than the particular evacuation paths with respect to the occupants that are not located in close proximity to the fire, and the indirect exits are further than the particular exits from the occupants that are not located in close proximity to the fire.

14. The system of claim 13, wherein the positioning and evacuation system determines that occupants for whom there are no safe evacuation paths should remain in place.

15. The system of claim 14, wherein the mobile computing devices display the evacuation paths in a user interface presented on the displays, and the user interface includes icons indicating locations of the fire and no entry icons indicating evacuation paths that are blocked and must be avoided during evacuation.

16. The system of claim 15, wherein the user interface further comprises selectable icons that enable the occupants to view turn by turn directions, zoom in, zoom out, and seek an alternative route.

17. The system of claim 16, wherein the positioning and evacuation system monitors a number of occupants that have been evacuated and a number of occupants remaining in the building and forwards the number of occupants that have been evacuated and the locations of the occupants remaining in the building to first responders.

18. A method for evacuating a building, the method comprising:
monitoring the building for indicators of fire with fire detection devices;
a positioning and evacuation system tracking locations of occupants in the building;
the positioning and evacuation system directing the evacuation of the building based on information from the fire detection devices by generating individualized evacuation paths for each of the occupants, prioritizing the order in which occupants are evacuated based on an availability of evacuation paths and each of the occupant's proximity to danger and transmitting the evacuation paths to mobile computing devices of the occupants in a sequence based on the prioritized evacuation order and updating the evacuation paths based on movements of the occupants and the fire and forwarding those updated evacuation paths to the mobile computing devices of the occupants; and
mobile computing devices of the occupants displaying evacuation paths on maps displayed on displays of the mobile computing devices, the paths being indicated by arrows overlaid on the maps displayed on the displays of the mobile computing devices.

19. The method according to claim 18, further comprising signaling a fire alarm condition for the building in response to fire being detected and transmitting the evacuation paths to the occupants in response to the fire alarm condition.

20. The method according to claim 18, further comprising generating turn by turn directions for the individualized evacuation paths, the turn by turn directions being transmitted to and displayed on the mobile computing devices.

21. The method according to claim 18, further comprising displaying icons in a user interface presented on the displays to provide indications of unsafe or blocked evacuation paths that must be avoided by the occupants during the evacuation of the building.

22. The method according to claim 18, further comprising monitoring a number of occupants evacuated and locations of occupants remaining in the building.

23. The method according to claim 22, further comprising forwarding a number of occupants evacuated and the locations of occupants remaining in the building to first responders.

24. The method according to claim 18, wherein monitoring the building for indicators of fire includes detecting smoke, rise in temperature, fire, carbon dioxide, and/or carbon monoxide.

25. A method for evacuating a building, the method comprising:
receiving event data from fire detection devices at a control panel;
the control panel determining if the event data are indicative of a fire;
initiating an alarm condition and forwarding the event data if the event data are determined to be indicative of an alarm condition by the control panel;
determining which areas of the building need to be evacuated by a positioning and evacuation system;
determining locations of occupants of the building by the positioning and evacuation system;
determining safe and unsafe evacuation paths for the building by the positioning and evacuation system;
determining which occupants should remain in place by the positioning and evacuation system;
generating evacuation paths to evacuate occupants and prioritizing an order of evacuation based on proximity to danger of the occupants and the availability of evacuation paths for the occupants and the determination of whether the occupants should remain in place by the positioning and evacuation system;
the positioning and evacuation system generating an evacuation plan that includes the evacuation paths for the occupants;
the positioning and evacuation system transmitting the individualized evacuation path information to mobile computing devices of the occupants via a network;

thereafter the positioning and evacuation system monitoring movements of the occupants and movement of the fire;
updating the evacuation paths based on the movements of the occupants and the movement of the fire by the positioning and evacuation system; and
the positioning and evacuation system forwarding the updated individualized evacuation paths to the occupants via the mobile computing devices.

26. The method of claim 25, further comprising:
the positioning and evacuation system monitoring a number of the occupants that have been successfully evacuated from the building and a number of occupants remaining in the building; and
the positioning and evacuation system providing evacuation status information, statistics, and exact locations of the occupants to the first responders.

27. The method of claim 25, further comprising the positioning and evacuation system determining locations of occupants of the building using technologies including a geo-positioning system, a geo-sensor based system, a Wi-Fi signal based system, a GSM (Global System for Mobile Communications) based system, or a geo-magnetic based system.

28. The method of claim 25, further comprising the positioning and evacuation system routing some occupants on longer paths and/or to indirect exits in high risk zones of the building while instructing occupants in low risk zones to remain in place until the occupants in the high zones have evacuated.

* * * * *